United States Patent [19]
Sinclair, Jr.

[11] Patent Number: 5,706,592
[45] Date of Patent: Jan. 13, 1998

[54] SNOW REMOVAL DEVICE

[76] Inventor: Sylvester Sinclair, Jr., 6405 Killarney St., Clinton, Md. 20735

[21] Appl. No.: 708,714

[22] Filed: Sep. 5, 1996

[51] Int. Cl.$^6$ .................. E01H 5/02; B62B 1/02
[52] U.S. Cl. .................. 37/265; 37/230; 37/434; 239/665; 222/192; 222/623; 248/176.1
[58] Field of Search ................ 37/434, 230, 264, 37/265, 263, 285, 403, 444, 903, 241; 239/665, 666, 669, 663, 657; 222/192, 623; 294/64.6, 51; 248/346.01, 176.1

[56] References Cited

U.S. PATENT DOCUMENTS

| | | | |
|---|---|---|---|
| 961,843 | 6/1910 | Compton | 37/434 |
| 1,224,349 | 5/1917 | Yessne | 37/434 X |
| 2,693,209 | 11/1954 | English | 248/176.1 X |
| 2,987,018 | 6/1961 | Vath | 239/663 |
| 2,997,796 | 8/1961 | Pogue et al. | |
| 3,065,556 | 11/1962 | Kampert | 222/623 X |
| 3,106,303 | 10/1963 | Finocchiaro | 37/434 X |
| 3,121,963 | 2/1964 | Nolan | 37/434 X |
| 3,475,838 | 11/1969 | Hagen et al. | |
| 3,580,601 | 5/1971 | Miles | 248/176.1 X |
| 3,771,188 | 11/1973 | Guth | 37/230 X |
| 3,773,229 | 11/1973 | Gandrud | 222/623 X |
| 4,161,073 | 7/1979 | Oakes | |
| 4,245,411 | 1/1981 | McMath | |
| 4,302,894 | 12/1981 | Emma | 37/434 |
| 4,571,861 | 2/1986 | Klever et al. | 37/241 |
| 4,629,203 | 12/1986 | Ballard | |
| 5,056,245 | 10/1991 | Jenkins et al. | |

FOREIGN PATENT DOCUMENTS

| | | |
|---|---|---|
| 624696 | 8/1961 | Canada . |
| 3503250 | 7/1986 | Germany . |
| 444209 | 2/1968 | Switzerland . |

*Primary Examiner*—Terry Lee Melius
*Assistant Examiner*—Thomas A. Beach
*Attorney, Agent, or Firm*—Richard C. Litman

[57] ABSTRACT

A snow removal push board and snow barrow. More specifically, the invention is a snow push board made up of a generally rectangular board with handles on one side and a scraping edge directly opposite the handles. The push board is operated by grasping the handles in front of the waist and allowing the board to be on an approximately forty-five degree incline from the user's waist to the ground while pushing the scraping edge along the ground. The snow barrow includes a board having a scraping edge and generally triangular sides. The snow barrow has handles for the user to grasp and push the barrow with two large wheels in the rear and two smaller wheels in the front of the barrow for maneuvering. The snow barrow also has structure for dispensing salt using either a vertical pinwheel or track dispersement axles in between the rear wheels of the barrow. The amount of salt dispensed can be controlled by adjusting a gauge.

8 Claims, 5 Drawing Sheets

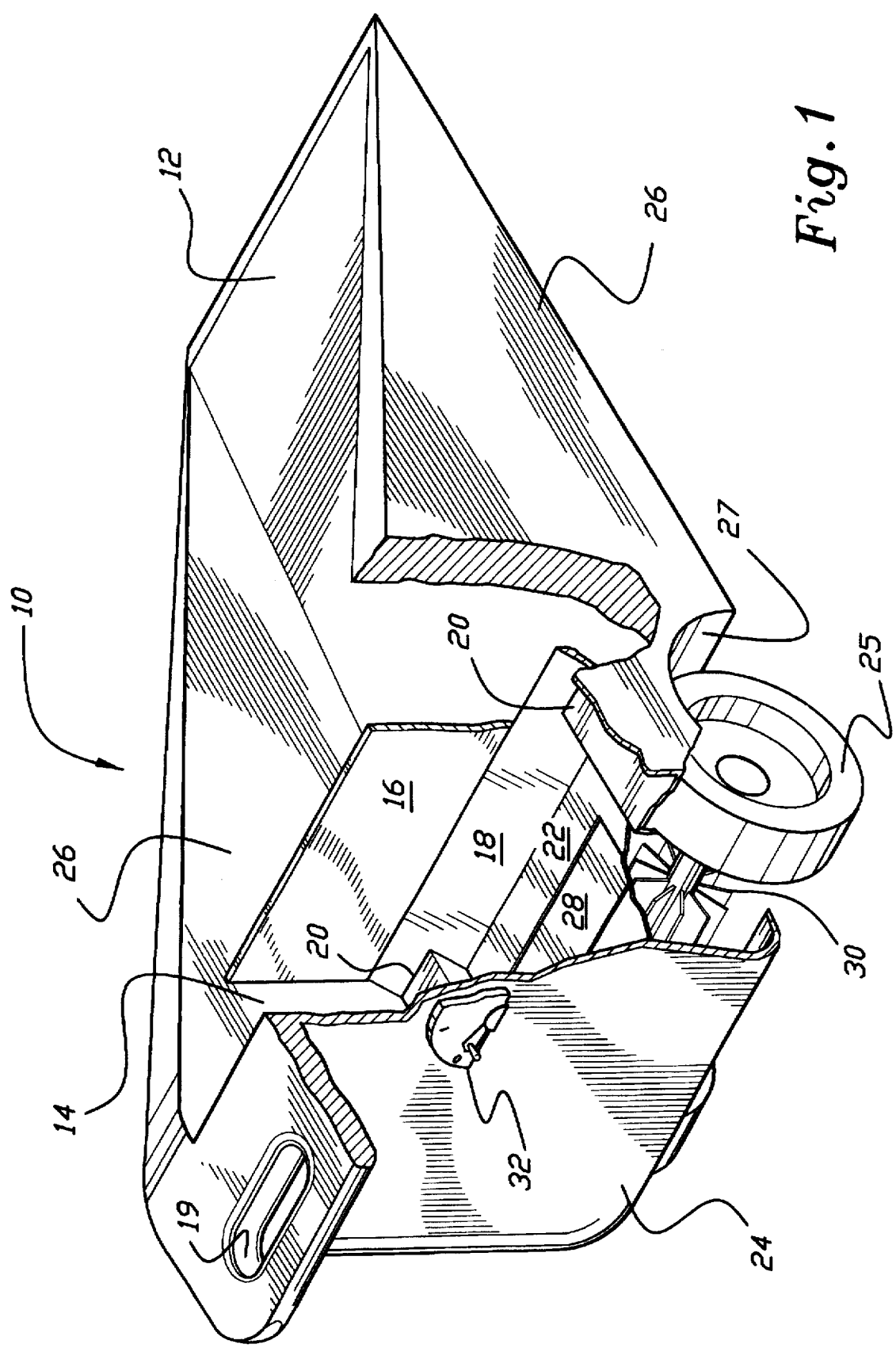

SNOW REMOVAL DEVICE

BACKGROUND OF THE INVENTION

1. FIELD OF THE INVENTION

The present invention relates to snow removal devices, specifically a snow barrow and a push board.

2. DESCRIPTION OF THE PRIOR ART

The invention relates to a snow removal push board and snow barrow. More specifically, the invention relates to a snow push board consisting of a generally rectangular board with handles on one side and a scraping edge directly opposite the handles. The push board is operated by grasping the handles in front of the waist and allowing the board to be on an approximately forty-five degree incline from the user's waist to the ground while pushing the scraping edge along the ground. The snow barrow consists of a board having a scraping edge and generally triangular sides. The snow barrow has handles for the user to grasp and push the barrow with two large wheels in the rear and two smaller wheels in the front of the barrow for maneuvering. The snow barrow also has means for dispensing salt using either a vertical pinwheel or track dispersement axles in between the rear wheels of the barrow. The amount of salt dispensed can be controlled by adjusting a gauge.

U.S. Pat. No. 2,997,796, issued on Aug. 29, 1961 to A. Pogue et al., U.S. Pat. No. 3,475,838, issued on Nov. 4, 1969 to K. G. Hagen et al., U.S. Pat. No. 4,161,073, issued on Jul. 17, 1979 to William Oakes, U.S. Pat. No. 4,245,411, issued on Jan. 20, 1981 to Edward McMath, U.S. Pat. No. 4,629,203, issued on Dec. 16, 1986 to Thomas Ballard, and U.S. Pat. No. 5,056,245, issued on Oct. 15, 1991 to Stephen L. Jenkins et al. teach snow scoops and pushers. The patent to Pogue teaches means for spreading salt. However, Pogue lacks the instant structure, particularly the snow scooping compartment.

The concept of scoops and carts is taught in Canadian Patent No. U.S. Pat. No. 624,696, issued on Aug. 1, 1961, Swiss Patent No. 444,209, issued on Feb. 15, 1968, and German Patent No. 3,503,250, issued on Aug. 7, 1986.

None of the above inventions and patents, taken either singly or in combination, is seen to describe the instant invention as claimed.

SUMMARY OF THE INVENTION

The invention relates to snow removal devices. In particular the devices have a snow scooping compartment including a bottom board having a scraping edge and a rear end, a pair of upwardly sloping sides, and a rear wall having handles. The devices include a snow push board and a snow barrow. The snow barrow has handles for the user to grasp and push the barrow with two large wheels in the rear and two smaller wheels in the front of the barrow for maneuvering. The snow barrow also has means for dispensing salt using either a vertical pinwheel or track dispersement axle in between the rear wheels of the barrow. The amount of salt dispensed can be controlled by adjusting a gauge. Storage for the snow removal devices includes a receptacle having a pair of nose holders and a triangular-shaped opening.

Accordingly, it is a principal object of the invention to provide snow removal devices that are maneuverable and have a greater surface area than traditional means of removing snow, i.e. snow shovels.

It is another object of the invention to provide a device that scoops the snow and "captures" it, as opposed to the traditional removal devices that push snow.

It is a further object of the invention to provide a device that can dispense salt as it is used.

Still another object of the invention is to provide means for controlling the quantity of salt that is dispensed.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is a perspective cut-away view of the snow barrow;

Similar reference characters denote corresponding features consistently throughout the attached drawings.

DETAILED DESCRIPTION OF THE PREFERRED EMBODIMENTS

Figure 2A:
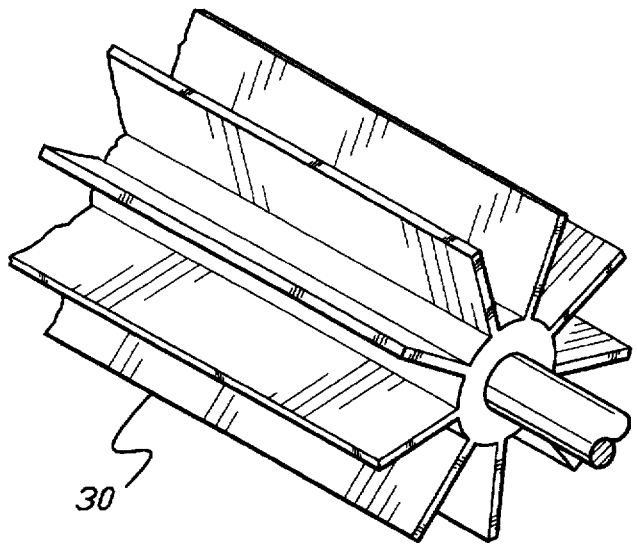
FIG. 2A is a perspective view of a portion of the track dispersement axle.

FIG. 1 shows the snow barrow 10. The basic components of the snow barrow 10 of substantially uniform construction defining a pair of rear wheel wells 27 for housing a pair of rear wheels 25 (only one of each pair shown) are the snow scooping compartment 12, the salt storage and dispensing compartment 14, and the partition 16 dividing the two compartments 12 and 14. The handles 19 (only one is shown) allow a user to easily push the barrow 10. Other components will be discussed below in conjunction with the discussion of the salt dispensing system.

Figure 2B:
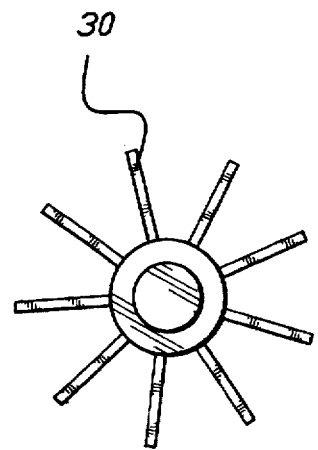
FIG. 2B is a cross-sectional view of the track dispersement axle.
Figure 2C:
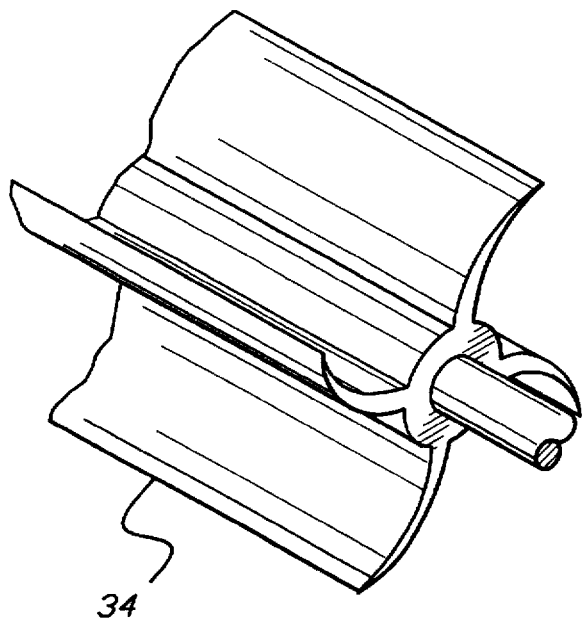
FIG. 2C is a perspective view of a portion of the pinwheel dispersement axle.
Figure 2D:
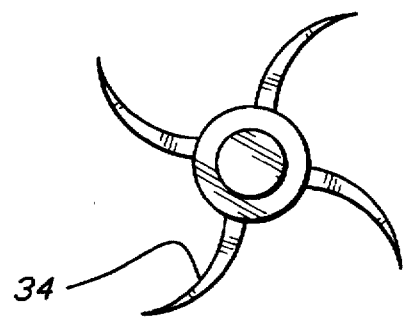
FIG. 2D is a cross-sectional view of the pinwheel dispersement axle.
Figure 3:
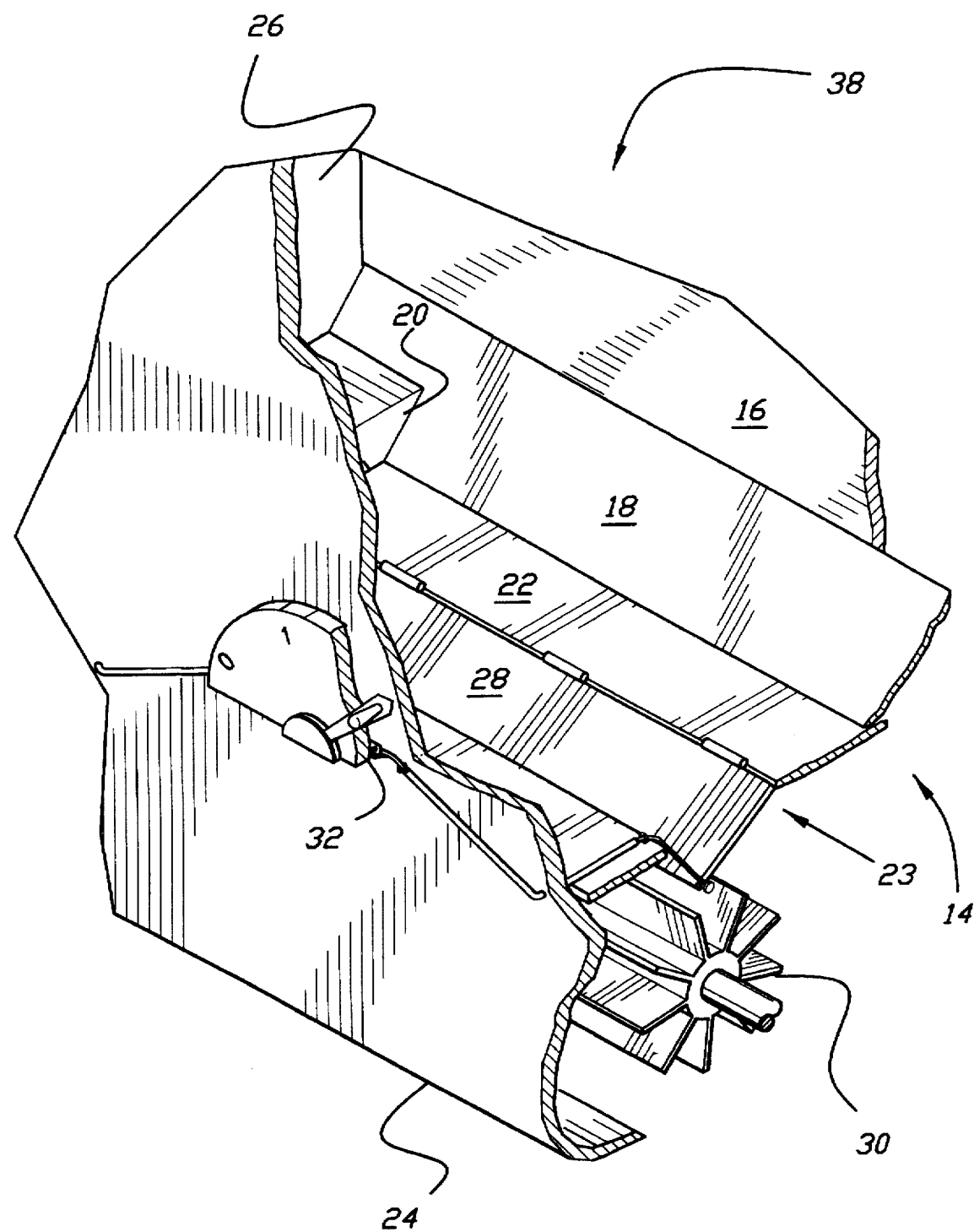
FIG. 3 is a perspective cut-away view of the salt dispensing system.

FIG. 3 shows the salt dispensing system 38. The dispensing system 38 includes the salt storage and dispensing compartment 14, which is bounded by partition 16, sloping wall 18, wheel wells 20, 20 (only one shown in FIG. 3), compartment bottom 23, rear wall 24, and side walls 26, 26 (only one shown in FIG. 3). The sloping wall 18 slopes from a lower portion of the partition 16 to the fixed portion 22 of the compartment bottom 23 and prevents salt from accumulating in the lower corner formed by the intersection of the partition 16 and the fixed portion 22 of the bottom 23. The dispensing system 38 includes a door 28 swingably mounted to the fixed portion 22 of the dispensing compartment bottom 23. The salt falls through the door 28 onto the axle, which can be either a track dispersing axle 30 (as seen in more detail in FIGS. 2A and 2B) or a pinwheel dispersing axle 34 (as seen in FIGS. 2C and 2D).

The opening of the door 28, which is mounted on hinges, is controlled by the weight of the salt and a tension system 32, which is attached to the door 28. The tension system 32 includes a lever which rotates along a gauge and a tension cable, preferably a nylon cord, which is connected at one end to the lever and at the other end to the door 28. As the lever is rotated clockwise along the gauge (to a higher number), the tension applied to the door 28 is decreased, allowing it to open further. Tension adjustments can be used to compensate for the changing weight of the salt as it is dispensed.

Figure 4:
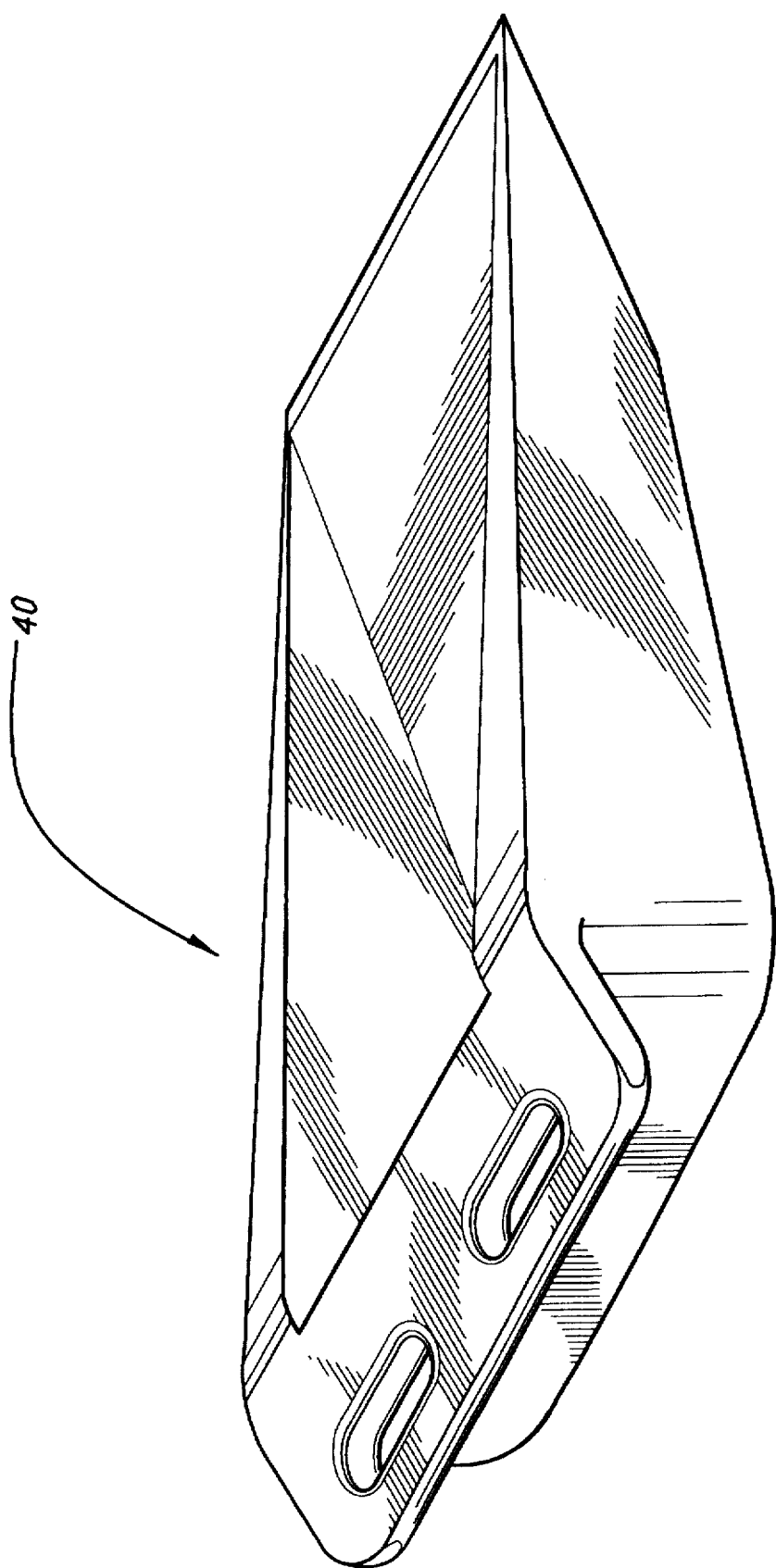
FIG. 4 is a perspective view of the push board.
Figure 5:
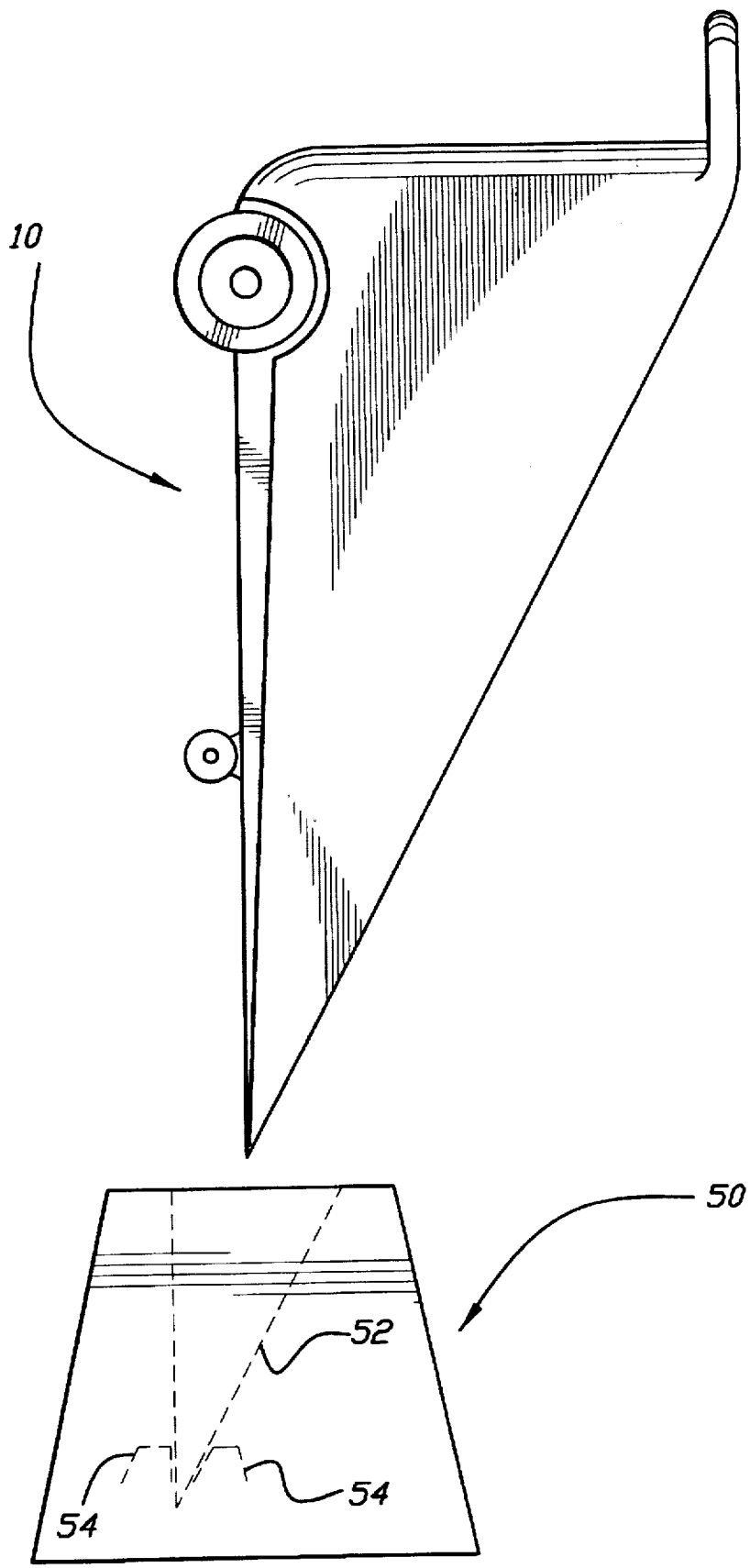
FIG. 5 is a side elevational view of the storage receptacle.

FIG. 5 shows a storage receptacle 50 for the vertical storage of the snow barrow 10 or the push board 40 (seen in FIG. 4). The storage receptacle 50 has a triangular-shaped opening 52 for receiving the nose of a snow removal device. Nose holders 54, 54 secure the snow removal device into the storage receptacle 50.

It is to be understood that the present invention is not limited to the embodiments described above, but encompasses any and all embodiments within the scope of the following claims.

I claim:

1. A snow removal device comprising:
   a barrow of substantially uniform construction having a rear wall and a pair of upwardly sloping sides defining a pair of rear wheel wells, said barrow including:
   a front snow scooping compartment including a bottom with a leading edge;
   a rear salt storage and dispensing compartment including a bottom having a fixed portion and a spring-actuated door swingably mounted to said fixed portion which allows for the dispensing of salt; and
   a partition separating said snow scooping compartment and said salt storage and dispensing compartment;
   a pair of rear wheels housed within said pair of rear wheel wells, said pair of wheels joined together by a rear dispersment axle.

2. The snow removal device of claim 1, further comprising a pair of front wheels located under said snow scooping compartment.

3. The snow removal device of claim 1, wherein said dispersement axle is a track dispersement axle for receiving and dispensing salt.

4. The snow removal device of claim 1, further comprising a gauge which is mechanically attached to said door for adjusting the opening of said door and the amount of salt dispensed.

5. The snow removal device of claim 1, further comprising a wall sloping from said partition to said bottom of said salt storage dispensing compartments, such that salt will be funneled to said door.

6. The snow removal device of claim 1, wherein said rear wall of said barrow includes handles.

7. The snow removal device of claim 1, in combination with a receptacle for receiving said snow removal device, said receptacle having a pair of nose holders and defining a triangular-shaped opening.

8. The snow removal device of claim 1, wherein said dispersement axle is a pinwheel dispersement axle.

* * * * *